United States Patent [19]
Kilian et al.

[11] Patent Number: 5,304,773
[45] Date of Patent: Apr. 19, 1994

[54] LASER WORK STATION WITH OPTICAL SENSOR FOR CALIBRATION OF GUIDANCE SYSTEM

[75] Inventors: Friedrich Kilian, Avon; Stephen R. Bolton, Bristol; Joseph J. Troiani, Burlington, all of Conn.

[73] Assignee: Trumpf Inc., Farmington, Conn.

[21] Appl. No.: 841,661

[22] Filed: Feb. 19, 1992

[51] Int. Cl.⁵ .............................................. B23K 26/02
[52] U.S. Cl. ........................... 219/121.78; 219/121.82; 219/121.83
[58] Field of Search ...................... 219/121.64, 171.78, 219/121.79, 121.83, 121.67, 121.72, 121.82, 121.63, 121.61, 121.62

[56] References Cited

U.S. PATENT DOCUMENTS

| | | | |
|---|---|---|---|
| 4,205,769 | 6/1980 | Blitchington | 226/24 |
| 4,226,148 | 10/1980 | Logan et al. | 83/71 |
| 4,382,395 | 5/1983 | Haar | 83/71 |
| 4,399,675 | 8/1983 | Erdmann et al. | 72/37 |
| 4,541,722 | 9/1985 | Jenks | 356/376 |
| 4,557,019 | 12/1985 | Van Devanter et al. | 17/52 |
| 4,628,578 | 12/1986 | Vajima | 29/408 |
| 4,640,160 | 2/1987 | Hards | 83/71 |
| 4,690,021 | 9/1987 | Clark | 83/71 |
| 4,697,485 | 10/1987 | Raney | 83/34 |
| 4,709,605 | 12/1987 | Clark | 83/23 |
| 4,721,058 | 1/1988 | Hayamizu et al. | 118/665 |
| 4,760,237 | 7/1988 | Mizukado et al. | 219/121.82 |
| 4,769,523 | 9/1988 | Tanimoto et al. | 219/121.6 |
| 4,776,579 | 10/1988 | Romand et al. | 271/228 |
| 4,807,991 | 2/1989 | Carew | 219/121.83 X |
| 4,817,477 | 4/1989 | Emery et al. | 83/23 |
| 4,867,569 | 9/1989 | Mohara | 356/375 |
| 4,890,382 | 1/1990 | Anderson et al. | 29/833 |
| 4,959,898 | 10/1990 | Landman et al. | 29/705 |
| 4,977,512 | 12/1990 | Nakagawa | 219/121.82 X |
| 5,045,668 | 9/1991 | Neihersel et al. | 249/121.83 |
| 5,132,510 | 7/1992 | Klingel et al. | 219/121.82 |

FOREIGN PATENT DOCUMENTS

| | | |
|---|---|---|
| 3743461 | 7/1989 | Fed. Rep. of Germany . |
| 1-183400 | 7/1989 | Japan . |

Primary Examiner—C. L. Albritton

[57] ABSTRACT

A laser work station has a base member, a laser head mounted on a laser head support carried on the base member for movement of the laser head relative to the base member, so that it is movable thereon in X, Y and Z axes. A guidance system effects precision movement of the laser head in the X, Y and Z axes to move the beam about a workpiece, and an optical sensor assembly comprising a light source and light sensors about the light source to detect light reflected from the surface of the workpiece. The sensor assembly is operable to detect reference formulations on the workpiece as it is moved thereabout. The computer control indexes the sensor assembly to a preselected position relative to the approximate position of a reference formation on the workpiece, and moves it in a predetermined path from the preselected position to sense passage of the beam over the edge of the reference formation, and the work station uses data obtained from such sensing of the passage of the beam over the edge of the reference formation to adjust the coordinates of the guidance system to reflect the actual position of the workpiece.

20 Claims, 7 Drawing Sheets

LASER WORK STATION WITH OPTICAL SENSOR FOR CALIBRATION OF GUIDANCE SYSTEM

BACKGROUND OF THE INVENTION

The present invention relates to laser work stations and, more specifically, to a laser work station in which a workpiece guidance system may be calibrated to reflect the actual position of the workpiece therein.

Laser work stations are now widely employed for cutting and welding various types of parts. Generally, in the processing of sheet metal workpieces, the workpiece may be supported upon a work table and moved by a clamping and guidance system about the table relative to a laser head at a fixed work station, or the laser head may be moved relative to the workpiece by the guidance system. In the latter type of laser work station, it is desirable to be able to effect relative movement of the laser head in X, Y, and Z axes.

In some work stations, the workpieces are loaded onto the workpiece support or work table automatically by robots or other loading devices, and in others the workpieces are loaded manually. Some work tables have loaders cooperating therewith to position the workpiece thereon in a position to be engaged by the clamping assembly for movement by the guidance system.

In some machining centers, workpieces are initially processed and moved from a first machine tool such as a punching or nibbling machine, and the further processing of the workpiece may require the precise alignment of the workpiece in the guidance system of the laser work station. In some installations, the workpiece may be supported on a cart or carrier which is moved into the work station, which may be moved within the work station, and which then may be withdrawn therefrom so as to minimize the handling within the station. In other installations, the workpiece may be moved into the work station on a pallet.

In the copending application of Fredrich Kilian and Hans Klingel, Ser. No. 07/577,475 filed Sep. 4, 1990, there is disclosed a laser work station in which the workpiece is moved on a carriage into the work station, and a sensor probe is provided for movement within reference formations in the workpiece to provide information on their precise location within the work station for correction of the X-Y guidance system to the coordinates of the workpiece on the support. However, such mechanical probes have been found to have limited accuracy and to be limited in the types of formations which they may detect.

It is an object of the present invention to provide a novel laser work station in which an optical sensor system accurately senses the position of reference formations on the workpiece to enable precise calibration of the guidance system to the actual position of the workpiece within the station.

It is also an object to provide such a laser work station in which the workpieces may be partially processed prior to entry thereinto, and their position within the station may be precisely and quickly determined for calibration of the guidance system.

Another object is to provide such a laser work station in which the X-Y guidance system of a laser work station is rapidly and accurately compensated to permit precise operation on a workpiece which has been previously processed and/or which has shifted as it is moved within the work station.

SUMMARY OF THE INVENTION

It has now been found that the foregoing and related objects may be readily attained in a laser work station comprising a base member, a workpiece support member, a laser head spaced about the workpiece support, and a laser head support member mounted on the base member for movement of the laser head relative to the base member and workpiece support. The laser head is movable relative to the workpiece support in X, Y and Z axes, and movement means is provided for moving the laser head in the X, Y and Z axes. A guidance system is connected to the movement means for effecting precision movement of the laser head in the X, Y and Z axes to permit the laser head to direct a laser beam onto a workpiece supported on the workpiece support.

The work station also includes an optical sensor assembly comprising (i) a light source for directing onto a workpiece on the support a light beam parallel to the Z-axis of movement of the laser head and (ii) light sensors about the light source for detecting light reflected from the surface of the workpiece upon which the light beam impinges, and the sensor assembly is operable to detect reference formulations on the workpiece carried by the workpiece support. Sensor assembly mounting means mounts the sensor assembly on the laser head.

Position determining means is connected to and cooperates with the sensor assembly and the guidance system to (i) index the laser head and sensor assembly to a preselected position relative to the approximate position of a reference formation on the workpiece; (ii) move the laser head and sensor assembly in a predetermined path from the preselected position to sense passage of the beam over the edge of a reference formation; and (iii) use data obtained from such sensing of the passage of the beam over the edge of the reference formation to adjust the coordinates of the guidance system to reflect the actual position of the workpiece on the workpiece support.

In the preferred embodiment, there is an elongated base member defining a work station therealong, and the laser head support member is a laser head support carriage mounted on the base member for movement along the length thereof. A laser head mounting assembly is movable along the laser head support carriage relative to the base member. The movement means is adapted to move (i) the laser head support carriage along the length of the base member (ii) the mounting assembly along the laser head support carriage, and (iii) the laser head vertically on the mounting assembly. As a result, the laser head is movable along the laser support carriage (Y axis), and movable with the laser support carriage along the base member (X axis), and movable in the vertical axis (Z axis) on the laser mounting assembly.

Desirably, the workpiece support is a carrier movable in a path parallel to the base member, and the carrier has a workpiece supporting surface at its top. The station includes guide means for guiding the carrier along the base member in the parallel path and carrier positioning means along the path for locating the carrier in a predetermined position along the base member. The carrier positioning means includes a first positioning element on the carrier and a second positioning element at a fixed location along the length of the base member, and the first and second positioning elements cooperate to position the carrier at a predetermined point along the length of the path.

Preferably, the workpiece support includes aligning means for positioning a workpiece placed thereon, and the work station includes a computer for controlling the movement means and the guidance system. The computer is operative in cooperation with the position determining means to move the sensor assembly to each preselected position, to effect the movement in a preselected path, to receive the sensed data, and to adjust the coordinates of the guidance system.

In the usual embodiments, the light sensors are disposed concentrically about the light source, and the light source and light sensors are fiberoptics. The work station also includes means for establishing a preselected distance between the laser head and the workpiece, and the sensor assembly includes movement means operable to move the sensor assembly relative to the laser head to a predetermined distance above the associated workpiece based upon the preselected distance of the laser head. The position determining means indexes the laser head and sensor assembly to at least two different locations about each reference formation. The position determining means is effective to determine the actual center of a circular reference formation and to calculate the offset of the actual center from the center of the circular reference formation as approximated to effect the adjustment of the guidance system.

The position determining means is also effective to determine the actual intersection of a formation having a pair of intersecting rectilinear edges and to calculate the offset of the actual intersection from the intersection as approximated to effect the adjustment of the guidance system. The position determining means may also determine the actual angular orientation of a substantially rectilinear edge and calculate the offset of the actual angular orientation relative to the angular orientation as approximated to effect the adjustment of the guidance system.

Desirably, the position determining means is operative to effect movement of the sensor assembly to at least two different reference formations on the associated workpiece and to process the data obtained from sensing the at least two formations to adjust the guidance system.

DETAILED DESCRIPTION OF THE PREFERRED EMBODIMENT

Figure 1:
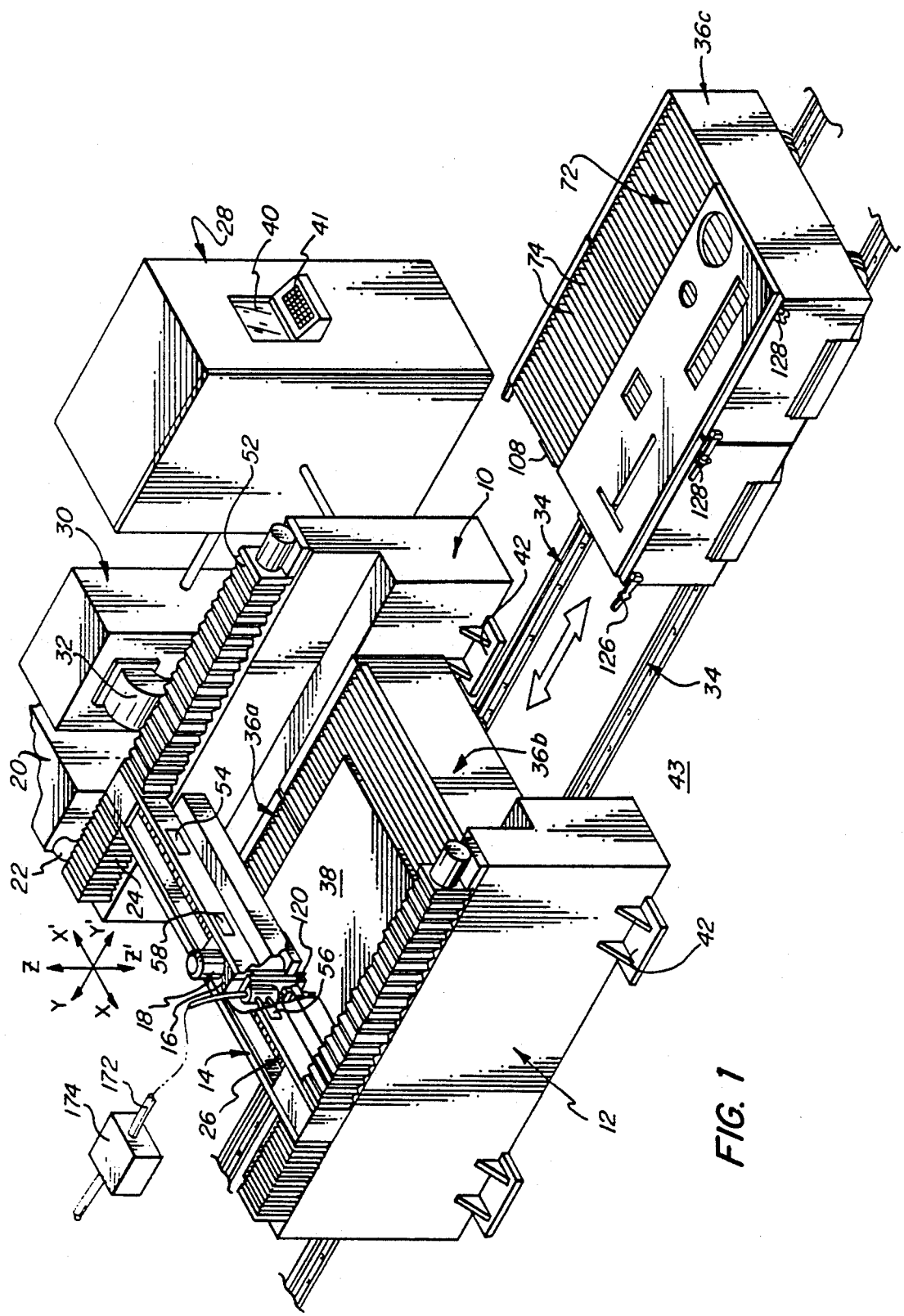
FIG. 1 is a fragmentary perspective view of a laser work station embodying the present invention showing a workpiece carrier positioned within the station, and a second carrier on the entry side of the work station.
Figure 2:
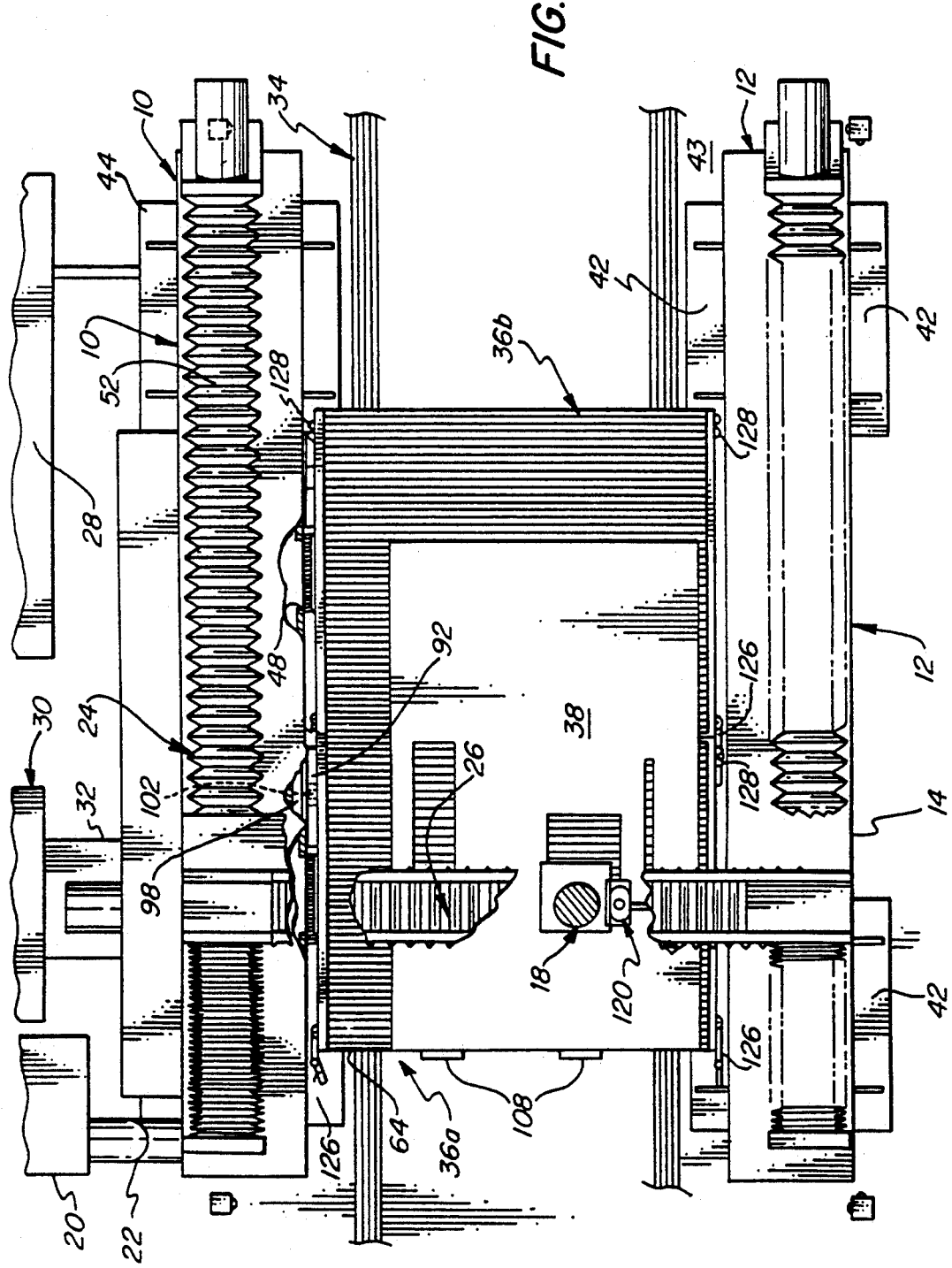
FIG. 2 is a fragmentary top plan view thereof.

Turning first to FIGS. 1 and 2 of the attached drawings therein illustrated is a laser work station embodying the present invention. A pair of elongated side frames generally designated by the numeral 10, 12 are spaced apart and support thereon a laser head support carriage generally designated by the numeral 14 which supports a laser head mounting assembly generally designated by the numeral 16. The laser head mounting assembly 16 carries the laser head generally designated by the numeral 18 and its structure supports a workpiece position sensor assembly generally designated by the numeral 120.

A laser beam is generated by the laser beam generator 20 and is transmitted to the laser head 18 through the beam delivery tube 22 and the beam bender optics within the carriage drive system generally designated by the numeral 24 and within the laser head drive system generally designated by the numeral 26. Operation of the laser beam generator 20 is under the control of the computer control unit 28, and fume generated by the operation is exhausted from the work station through the fume exhaust system generally designated by the numeral 30 and connected to the side frame 10 through the duct 32.

Extending through the laser work station are a pair of tracks or rails generally designated by the numeral 34 on which are movable carts generally designated by the numeral 36 which support workpieces thereon generally designated by the numeral 38.

As seen in FIG. 1, the control unit 28 includes a CRT display 40 and a keyboard 41.

The overall construction and operation of the illustrated work station is described and illustrated in detail in the copending application of Hans Klingel and Friedrich Kilian, Ser. No. 07/577,475 filed Sep. 4, 1990.

As described therein, the side frames 10, 12 are securely fastened to a monolithic slab by the mounting pads 42. Extending along the upper surfaces of the side frames 10, 12 is the carriage drive system 24 which includes a bellows 52 to expand and compress as the laser head support carriage 14 moves from one end thereof to the other in response to the drive action of the drive mechanism 54, which is diagrammatically illustrated in FIG. 1. As is known, such drive mechanisms generally employ rack and pinion mechanisms to enable precise positioning.

Similarly, the laser head mounting assembly 16 is movable transversely of the work station by a similar rack and pinion mechanism under operational control of the drive mechanism 56 which is also diagrammatically illustrated in FIG. 1. Lastly, the laser head 18 may be moved vertically by a belt drive system operated by the drive mechanism 58 which is diagrammatically illustrated in FIG. 1.

These drive mechanisms are generally known to persons skilled in this art and therefore are not illustrated in greater detail.

Figure 13:
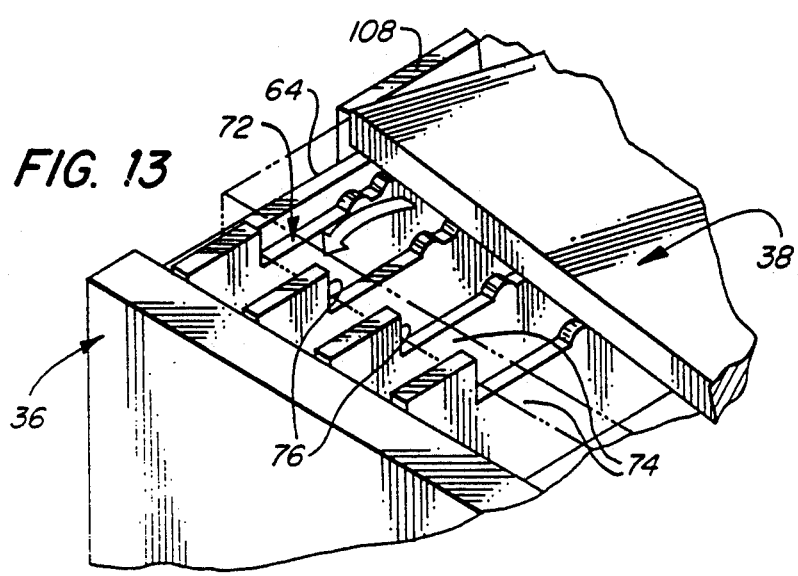
FIG. 13 is a fragmentary perspective view of a cart or carrier and workpiece showing the positioning elements.

The cart or carrier 36 has a grid support member generally designated by the numeral 72 and comprised of a multiplicity of spaced transversely extending slats 74 of substantially greater height than width or thickness. As seen in FIG. 13, adjacent their ends the slats 74 have vertical shoulders 76 to facilitate positioning the workpiece 38 thereagainst. Pivotable stops 108 are provided on the front wall 64 of the cart or carrier 36 to position the forward edge of the workpiece 38.

To engage two or more carts or carriers 36 in front to rear assembly for long workpieces, the front end of the cart 36 is provided on each side with forwardly projecting latch arms 126 which releasably engage in the latch receptacles 128 at the rear ends of the carts.

Turning now to FIGS. 3-8, therein illustrated in detail is the workpiece position sensor assembly 120 which permits precise realignment of the coordinates of the guidance system to reflect the actual position of the workpiece 38 after it has been moved into the work station.

Figure 3:
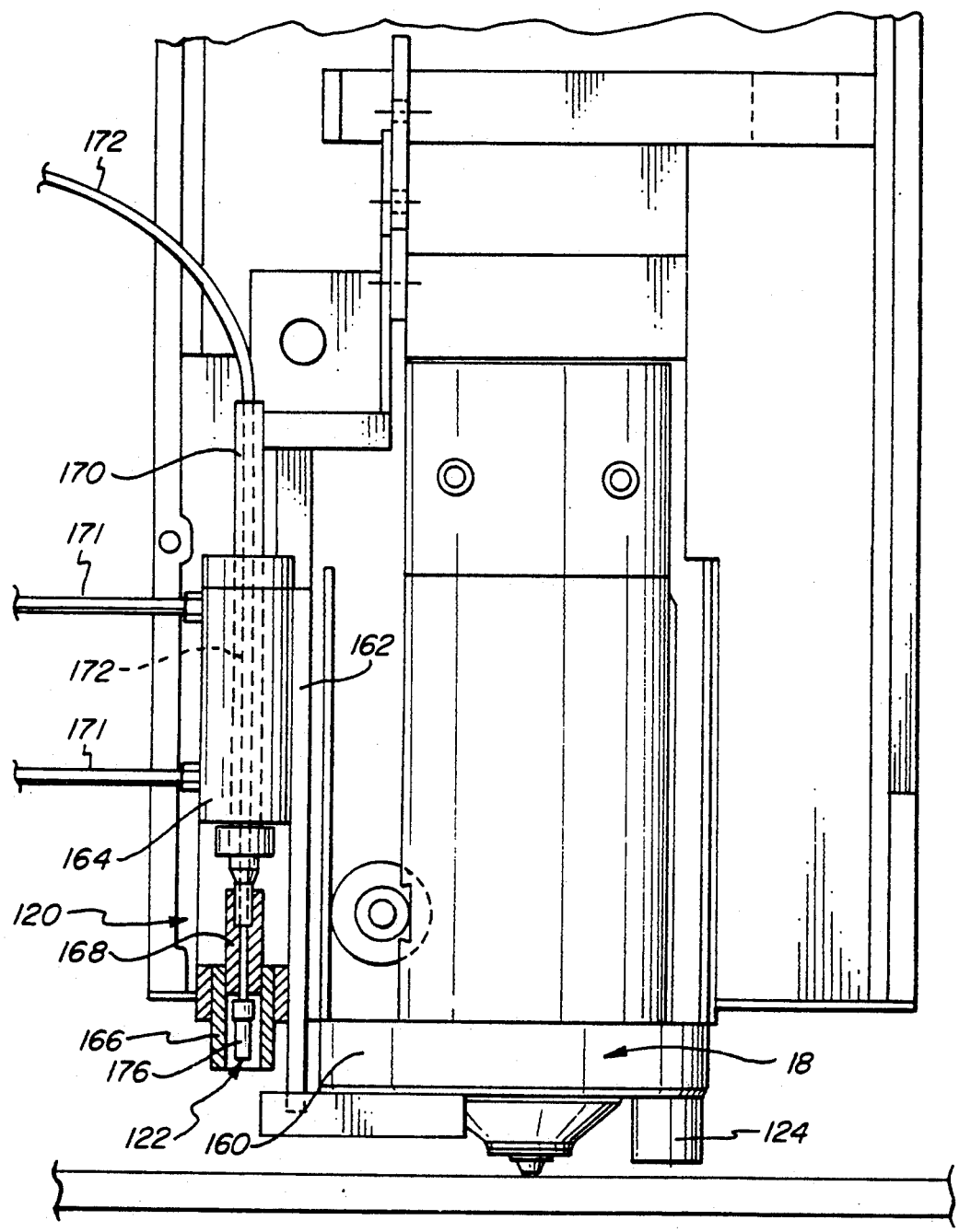
FIG. 3 is a fragmentary front elevational view of the laser head and optical sensor assembly positioned over a workpiece and with the sensor head in its elevated position.
Figure 4:
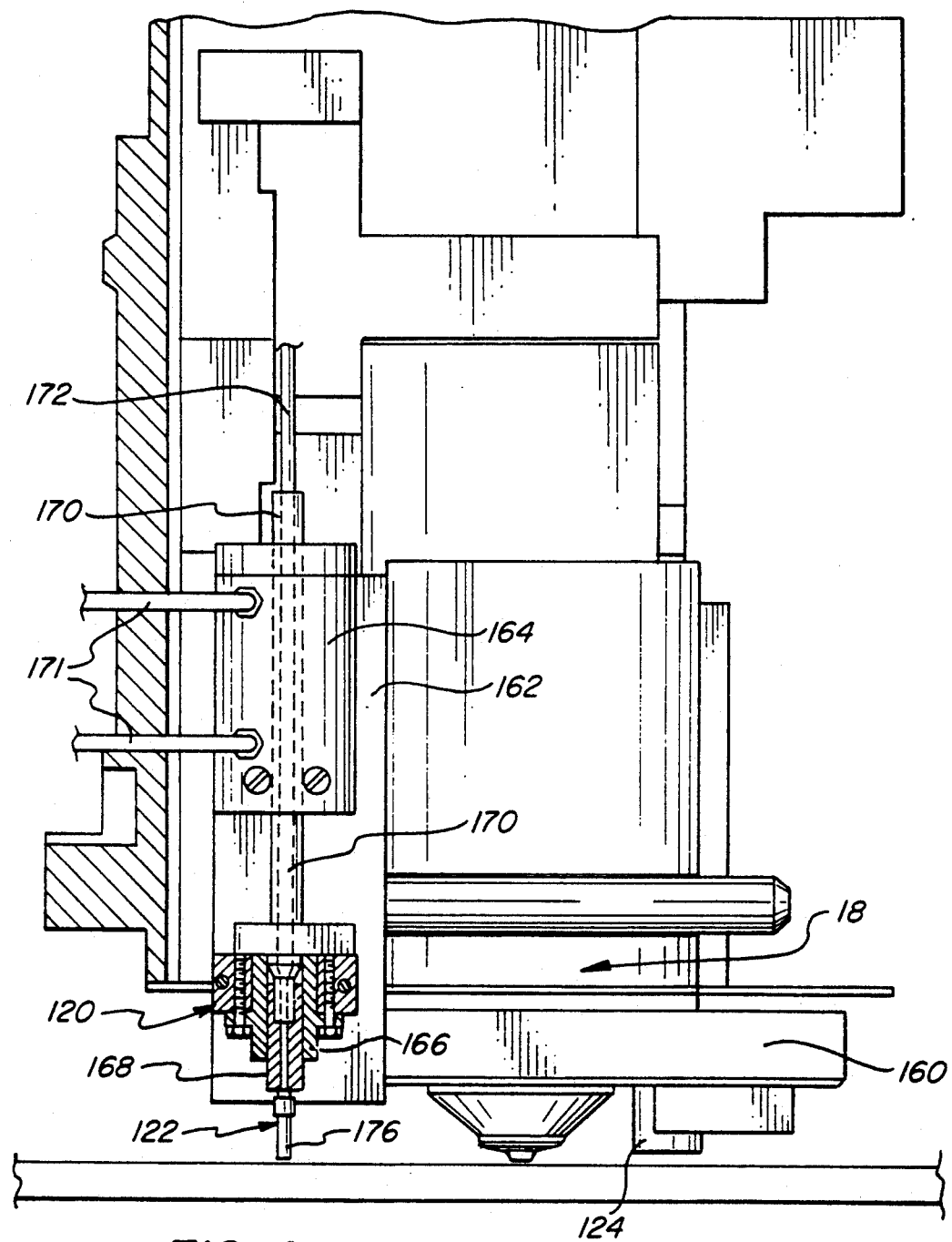
FIG. 4 is a fragmentary side elevational view of the laser head and optical sensor assembly of FIG. 3 with the sensor head in its operative position.

As seen in FIGS. 3 and 4, the optical sensor assembly 120 is mounted on the laser head carrier plate 160 by the bracket 162 which carries its air cylinder 164 and guide bushing 166. The sensor head 122 may be moved by the air cylinder 164 vertically relative to the laser head 18 in the guide bushing 166. In its inoperative position seen in FIG. 3, the sensor head 122 is elevated and has its lower end disposed within the bushing 166. In its operative position seen in FIG. 4, it is moved downwardly by the piston shaft 170 and spaced closely adjacent the upper surface of the workpiece 38. The fiberoptic cable 172 extends coaxially through the piston shaft 170, to which the head 122 is attached, and about which the carrier bushing 168 extends. Pressurized air is supplied to the cylinder 164 through the couplings 171.

Figure 5:
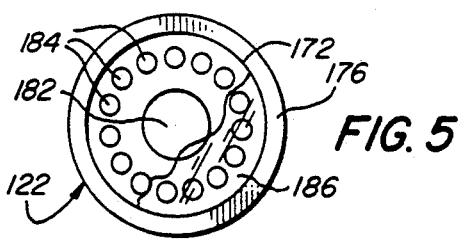
FIG. 5 is a bottom view of the sensor head with the lens broken away.
Figure 6:
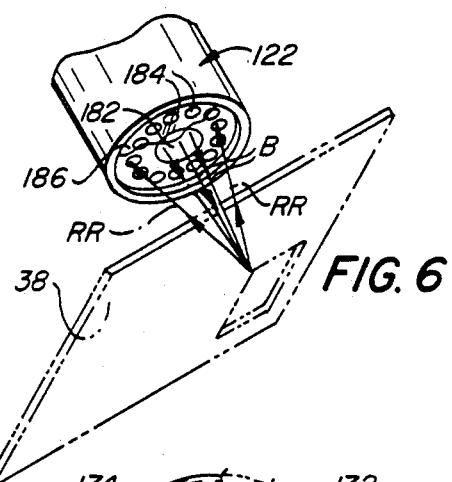
FIG. 6 is a schematic perspective view of a workpiece shown in phantom line, and of a portion of the sensor head with the lens removed and having ray traces indicating the emmited light beam and reflected light rays.

The fiberoptic cable 172 is connected to the light source amplifier unit 174 which generates a light beam and amplifies the signal from detectors, all of which are located in the sensor head 122 which has a sleeve 176 secured in the carrier bushing 168. As seen in FIGS. 5 and 6, the sleeve 176 contains the termination of the fiberoptic strands within the cable 172 and a focusing lens 186.

The fiberoptic cable 172 is made up of multiple strands or fibers arranged coaxially about a center fiber or strand. The red light is transmitted through the center fiber 182 and the reflected light is received by the fibers 184 which are closely spaced about the circumference of the cable 172. Because of this arrangement, position sensing is constant regardless of the direction of travel of the rays to the reflecting target.

The focusing lens 186 at the lower end of the head 122 is conveniently a glass lens, and a focal length of 7 mm will produce a visible spot diameter of 0.4 mm on the workpiece 38 located at that distance.

The amplifier unit 174 to which the fiberoptic cable 172 is connected serves as an optical/electrical converter. The unit 180 contains a light emitting diode acting as a visible red light source, a reflected light receiver circuit, and a comparator circuit. A satisfactory commercial amplifier is sold by KEYENCE under the Model designation FS2-65 and it has an open collector output which will sink 100 mA of current at 24 VDC, and have a switching speed of 50 microseconds. The percentage of reflected light required to switch the comparator can be adjusted by a trim potentiometer on the amplifier.

Figure 8:
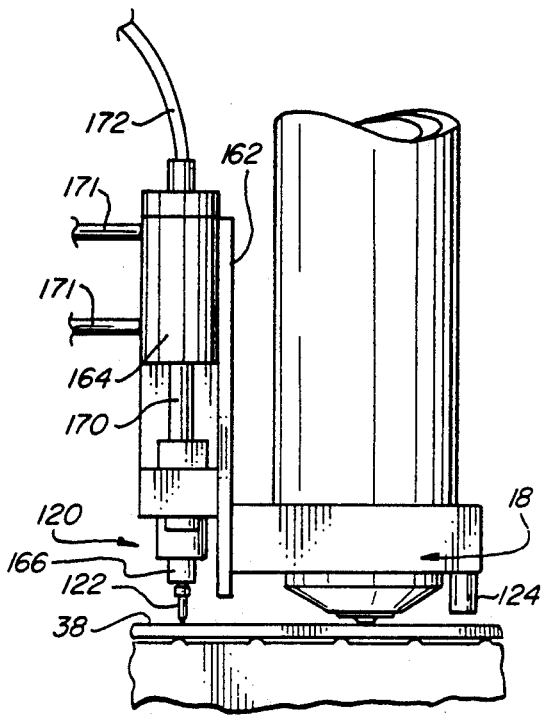
FIG. 8 is a fragmentary front elevational view of the assembly seen in FIG. 7.
Figure 7:
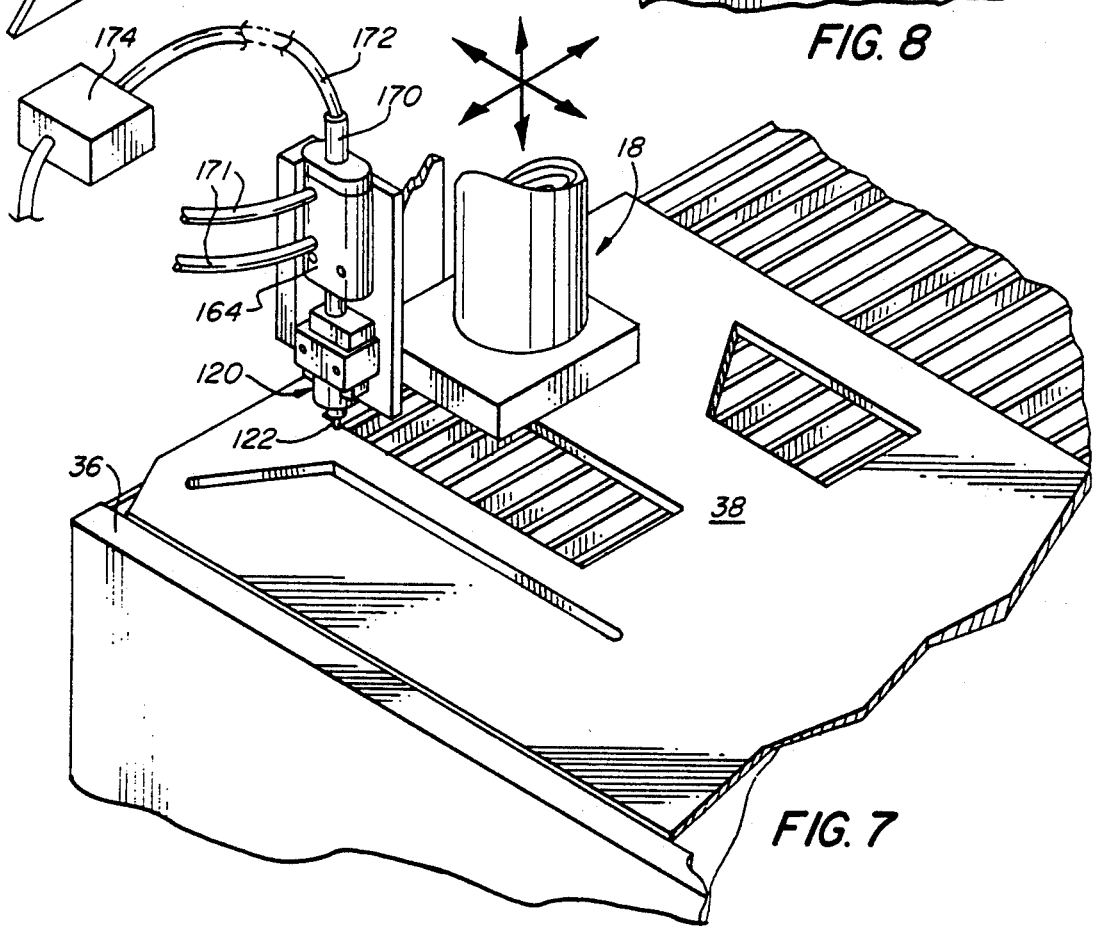
FIG. 7 is a diagrammatic perspective view of a fragmentary portion of the laser head and optical sensor assembly for sensing the contour and location of reference cutouts of a fragmentarily illustrated workpiece.
Figure 9:
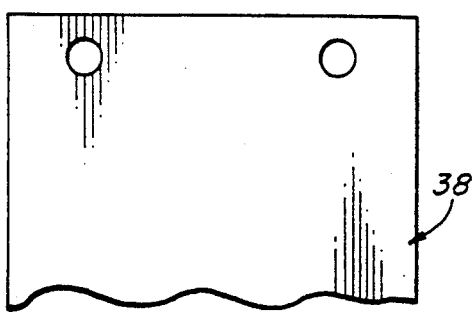
FIG. 9 illustrates a fragmentary workpiece provided with a pair of circular reference cutouts adjacent its leading edge.

As seen in FIGS. 6 and 8, the central fiberoptic emitter 182 of the sensor head 122 emits light rays B, and the multiplicity of fiberoptic receivers 184 disposed circumferentially thereabout detect light rays RR reflected from the impingement of the light beam B on the surface of the workpiece 38.

Because the sensor assembly 120 is mounted upon the side of the laser head 18, it moves upwardly and downwardly therewith. As seen, the air cylinder 164 and guide bushing assemblies ride on a steel bracket 162 which extends below the plane of the sensor head 122 in the inoperative position to provide protection for it during laser cutting operations. Conveniently, the guide bushing 166 is attached to the bracket 162 and the bracket 162 is supported on the laser head carrier plate 160. The head 122 is attached to the cable 172 and is pulled into the guide bushing 166 when the cylinder 164 moves it to the up position to provide further protection.

The sensor head 122 movement relative to the laser head 18 and the workpiece 38 by the pneumatic piston 164 is under control of the computer 28. The laser head 18 has an electromagnetic sensor 124 to enable precise vertical spacing of the laser head 18 relative to the workpiece 38, thereby providing a precise vertical spacing for further movement of the sensor head 122 on the laser head 18.

As will be appreciated, the sensor assembly 120 may be moved about the workpiece 38 by movement with the laser head 18 under control of the guidance system to enable accurate determination of the orientation of the workpiece 38 upon the carrier 36 and calibration of the guidance system, as will be discussed more fully hereinafter.

In operation of the laser work station, the workpiece 38 is placed upon a carrier 36. If two or more carts or carriers 36 are employed, they are locked together by the latch mechanisms 126, 128. The carts 36 with the workpiece 38 thereon are then moved along the tracks or rails 34 until the positioning plate 92 on the side of the forward cart 36a moves into alignment and with the locking engagement with a cooperating alignment element 106 to position the cart 36, as seen in FIG. 2.

Electrical signals generated by the computer program in the computer control 28 cause the motors 54 and 56 to move the carriage 14 along the length of the workpiece 38 and the laser head support 16 across its width as is conventional in such work stations. In addition, the motor 58 is operative to move the laser head 18 upwardly and downwardly relative to the workpiece 38 to achieve the desired focusing of the laser beam on the workpiece 38. In this fashion, a workpiece 38 occupying the full length of the work station may be processed in accordance with the computer program stored in the computer control 28.

For precision cutting of a workpiece 38 which has already been processed in another machine such as a punch press, or which is moved within the work station after the initial processing in a first position thereof, it is desirable to utilize the position sensor assembly 120 to sense one or more reference formations on the workpiece 38 which has already been processed to determine a precise $X^0$, $Y^0$ coordinate position for the guidance system in the further processing of the workpiece 38. This will compensate for any shifting of the workpiece 38 which may occur during movement with the work station, or ensure proper orientation of the workpiece 38 which is being initially placed therein.

When the laser head 18 and sensor assembly 120 are indexed and the beam B passes over the edge of a cutout 134 or a side or end edge 136 of the workpiece 38, the intensity of the light rays RR detected significantly drops, thus enabling detection of the edge. This change in intensity of returning rays RR is processed by the computer 28 and is associated with the X-Y position as reflected by the guidance system, all as will be discussed more fully hereinafter.

Because the accuracy of the optical sensor assembly 120 is dependent upon its precise vertical spacing relative to the workpiece 38 as it is located at several positions thereabout, and workpieces may be bowed or otherwise non-uniform in such spacing, the guidance system initially moves the laser 18 to the coordinate of the position to be inspected, as entered by the operator, and the laser head 18 is moved to a precise vertical spacing above the workpiece 38 as determined by the electromagnetic sensor 124. The pneumatic cylinder 164 then moves the optical sensor head 122 to its predetermined vertical spacing above the workpiece 38.

Thereafter, the guidance system moves the head 18 and sensor assembly 122 about the position in accordance with a programmed set of precise movements and distances.

After inspection of the position, the sensor head 122 is elevated and the laser head 18 indexed to the next position, and the procedure is repeated.

In a working embodiment of the present invention, the computer 28 has been provided with instructions which enable the sensor assembly to inspect reference formations of various types. The operator enters the parameters of the formations to be inspected on the workpiece; the computer determines the offset of the actual position of the workpiece from the position indicated by the coordinates entered when the workpiece is placed on the support, and then effect the recalibration of the guidance system coordinates to coincide with the determined position.

The sensor and recalibration software is desirably written in modular form. As developed for an operating installation using a Model CC-220 CNC Control made by Bosch AG, it conveniently consists of 9 CPL programs and a small amount of code in the PLC. The actual computer code is attached hereto as a microfiche appendix. It should be noted that the programmable logic controller (PLC) portion in this embodiment is small because the Z axis is controlled internally by customer programming language (CPL) programs. If the sensor is adapted to other machines, changes may be required in the location of the code.

In this working system, the following CPL programs were created to use the sensor assembly for recalibrating the guidance system to reflect the actual position of the workpiece on the support surface.

| CALL | PROGRAM | DESCRIPTION |
|---|---|---|
| G774 | 19990774 | Calibrating program. |
| G775 | 19990775 | Measure points of a round reference hole. |
| G776 | 19990776 | Measure points on 2 intersecting perpendicular lines. |
| G777 | 19990777 | Transform guidance system axes by data obtained from measurement of 2 points. |
| G778 | 19990778 | Locate a qualified sheet. |
|  | 19991775 | Calculate center of a circle. |
|  | 19991776 | Calculate intersection point of two right angular lines. |
|  | 19991778 | Calculations for a qualified sheet. |
|  | 19990780 | Height regulation measurement cycle. |

As seen in the part programmer codes, it is considered desirable to separate measurement functions and calculation functions; this is also the case within the CPL programs. For example, Program 19990775 measures the 4 points of a circle and then calls Program 19991775 to calculate the center point using an averaging method. The several routines may be more completely indicated as follows:

| | |
|---|---|
| G774[P1, P2, P3] | Automatic calibration of the sensor offset in relation to the laser cutting beam. |
| G775[P1, P2, P3] | Measure four points of a round hole and calculate the center point. |
| G776[P1, P2, P3, P4] | Measure four points on two perpendicular lines and calculate the intersection point. |
| G777[P1, P2, P3, P4] | Transform the cooordinate system using two previously measured points. |
| G778[P1, P2, P3, P4, P5, P6, P7] | Measure four points of a qualified sheet and transform the coordinate system. |
| Two offset registers are also used which are: | |
| G58 X = | Offset from the sensor detection of an edge and the actual edge. |
| G59 X, Y = | Offset of the sensor relative to the center of the laser nozzle or laser beam. |

The first step in using the sensor assembly is to run the standard NC calibration program provided which calls for Program G774 to cut a square hole in the workpiece for calibration of the guidance system for a workpiece of a new thickness. Three parameters are specified.

P1=Exact center of the square in the X axis.
P2=Exact center of the square in the Y axis.
P3=Exact size of the square.

This program uses the laser beam to cut a square hole to an exact dimension taking into consideration the width of the laser beam, and the internal cutout is carefully removed. Next, movement of the sensor assembly in the Z axis will measure with the height control unit two points on each side of the square spaced inwardly 25% of the length from each corner.

The G59 offset program is then activated and the sensor assembly moves in Z axis to the first calculated height in order to achieve a 7 mm focal length. The air cylinder is then energized to the down position. The machine positions the laser head so that the axis of the sensor is at a distance of 8 mm along a line perpendicular to the edge being measured and it moves the laser head (and thereby the sensor head) at 1 m/min. until the edge is detected. The program then backs up the sensor a distance of 2 mm from the edge and sweeps a second time at 0.1 m/min.. This position is then stored for future calculations.

The sensor always begins a measurement from a position in which it will sense the material of the workpiece and moves to the edge. This is done to minimize problems of detecting slats in the support surface of a pallet system or cart. If, during a measurement sweep, the end point of the sweep move is reached without the sensor having generated a switching signal, an error message is displayed. In addition, if the deviation between each set of two points of the square exceeds a maximum deviation of 0.1 mm in the axis perpendicular to the edge, an error message is displayed.

After all 8 points have been measured, the G59 X,Y offsets and G58 X offset are calculated and automatically written to the offset table to be used for further processing of like workpieces.

Program G774 desirably contains graphics which show the operator the sequence of measurements, their values, deviations, and calculated offsets for analysis.

The preferred reference formations which are formed in the workpiece during initial processing are round holes, preferably of about 8-25 mm in diameter. In the subsequent processing of a workpiece in which such round reference holes have been generated as an incident to the initial processing of the workpiece, the operator enters data concerning the diameter and X, Y coordinates of the holes as derived from the prior processing.

The operator uses Program G775 to determine the coordinates of the actual center of this round hole. The user is required to enter 3 parameters.

P1 = Approximate center of the hole in the X axis.
P2 = Approximate center of the hole in the Y axis.
P3 = Exact diameter of the hole.

The part must be located on the support so that the reference hole is within +/−5 mm of the approximate X, Y center coordinates of the hole as entered.

Figure 10:
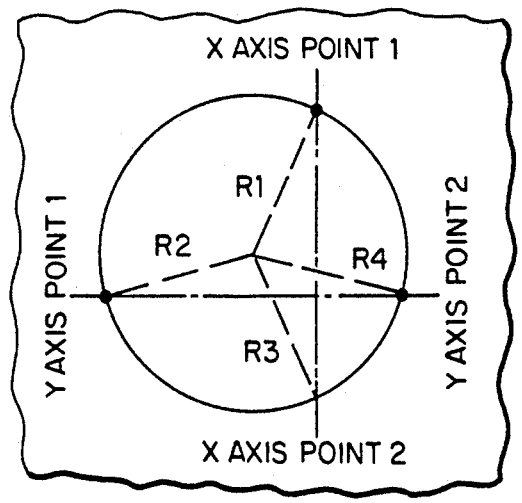
FIG. 10 diagrammatically illustrates the motions of the sensor assembly in determining the actual position of one of the cutouts in FIG. 9.

The G775 CPL will take two measurements in both the X and Y axes for each hole, and the sweep direction and sequence are indicated in FIG. 10. The guidance system positions the measuring axis of the sensor head from the center of the coordinates of the hole as entered by the operator at a distance equal to the radius of the hole plus 8 mm along a radial line, and it then sweeps the laser head inwardly at 1 m/min. until the edge is detected. The guidance system then backs up the sensor head 2 mm and sweeps a second time at 0.1 mm/min.. The coordinates of this edge position is stored for future calculations.

After four points have been measured, the X and Y values are averaged to determine the center of the hole. Radius calculations are performed using the measured points and the calculated center point. After the G775 CPL program calculates the center of the circle, 4 radius values are also calculated. The four radius values are compared, and should not exceed a maximum deviation value of 0.2 mm. If this deviation is exceeded, an error message is displayed.

The X, Y coordinates of the center are stored as well as data indicating whether the hole is the first or second geometric element measured. This is needed later for determining the rotational transformation.

Because the same codes are repeated for each height regulation measurement cycle, Program 19990780 was created as a separate routine.

If the programmer wishes to calculate a center point of a circle using quadratic equations and 3 points, it was found that some time was required for a Bosch control to calculate the quadratic equations with no advantage in accuracy.

In the preferred technique, at least two such circular holes are used, and the operator inputs the data as to each of the holes. After the data has been stored from the inspection of the first hole, the machine will automatically index to a start position for the next hole.

Program G776 is used to determine the corner point of two straight lines intersecting at a right angle, i.e., a triangular cutout, and it requires the operator to enter four parameters for the workpiece being placed upon the support.

P1 = Approximate corner point in the X axis
P2 = Approximate corner point in the Y axis.
P3 = Measurement increment plus or minus along the X axis.
P4 = Measurement increment plus or minus along the Y axis.

Figure 11:
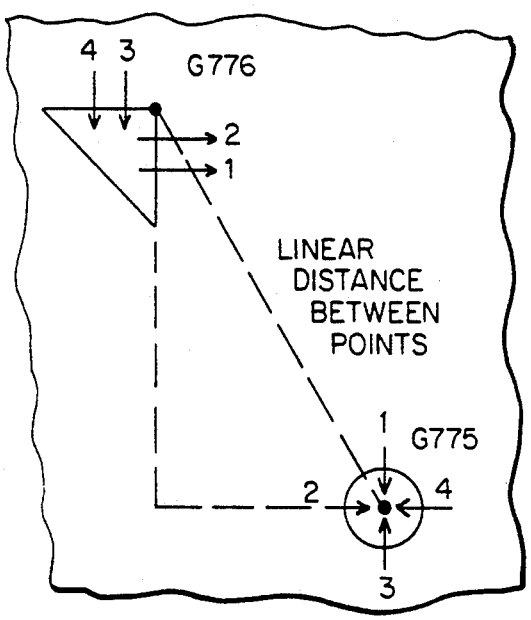
FIG. 11 diagrammatically illustrates the motion of the sensor assembly in determining the actual position of a triangular or rectangular cutout.

The sweep sequence and direction are shown in FIG. 11. Parameters P1 and P2 define the corner point. Parameter P3 is a negative value, and Parameter P4 is a positive value.

The actual corner of the part must be located on the workpiece support within +/−5 mm of the approximate X, Y corner coordinates for the workpiece as entered by the operator. The measurement increment values are signed (+ or −) values based on which direction the guidance system is to be located along a line relative to the corner point and the machine absolute coordinate system (see FIG. 11). Two measurements are taken in both the X and Y axes.

The guidance system positions the measuring axis at an initial distance of the entered increment plus 8 mm along a line perpendicular to the edge being measured. The measuring cycle assumes the lines of movement are relatively parallel to the axes, or within the 8 mm "safety" distance. Because of this, diamond shapes, for example, cannot be measured. The double sweep cycle as described in G775 is used to obtain the four points. The slope of each line is tested by the computer program to ensure that the lines are not parallel, and the corner point is calculated. The corner coordinates are stored as well as data as to whether the points from the first or second geometric element measured. This is needed later for determining the rotational transformation.

G777 CPL calculates and compares the linear distance between the measured points and the points defined as parameters P1 through P4. The deviation value must be less than 0.4 mm. It is used to transform the coordinate system based upon data determined by the foregoing evaluations. The following parameters are required to have been entered by the operator.

P1 = X axis programmed position of point number 1.
P2 = Y axis programmed position of point number 1.
P3 = X axis programmed position of point number 2.
P4 = Y axis programmed position of point number 2.

The G777 CPL will take the measured points from either G775 and/or G776, compare these points with the programmed points and transform the coordinate system. The linear distance between both the measured points and the programmed points is calculated. If the deviation in linear distance is greater than 0.4 mm, an error message is displayed.

Using a numerical control for the guidance system made by Bosch Ag, Model CC-220, the coordinates transformation is done using G92, G37, and G38 Bosch programming codes. Thus, a part programmer cannot use the following codes in the sensor programming:

G60   programmable zero offset.
G54–G59   fixed offsets.
G37–G38   part rotation.
G92 is allowed only prior to the sensor CPL calls.

G778 is a program which may be used to locate the position of a qualified rectangular sheet without reference cutouts. It is a single program which both measures the points and calculate the transformation of the guidance system. The following parameters are required to be entered by the operator.

P1=Approximate corner point in the X axis.
P2=Approximate corner point in the Y axis.
P3=Measurement for increment plus or minus along the X axis.
P4=Measurement for increment plus or minus along the Y axis.
P5=X axis programmed reference position of the corner point. (If start position is offset).
P6=Y axis programmed reference position of the corner point. (If start position is offset).
P7=1=Calculate the rotation value from the X axis line. (If sheet edges are known not to be perpendicular).
P8=2=Calculate the rotation value from the Y axis line. (If sheet edges are known not to be perpendicular).

Figure 12:
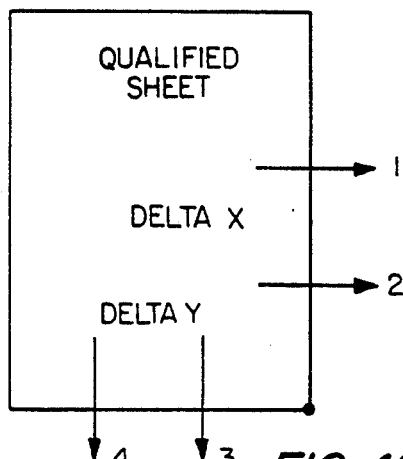
FIG. 12 diagrammatically illustrates the motion of the sensor assembly in determining the actual position of the edges of a rectangular workpiece.

Program G778 has substantial similarities to Program G776. The workpiece must be located on the workpiece support so that its actual position is within +/−5 mm of the approximate X, Y corner coordinates as entered by the operator. In addition, the workpiece must be parallel to the axes of the guidance system within 10 mm. The measurement increment values are signed (+or −) values based on the direction in which the guidance system is to be located along a line relative to the corner point and the machine absolute coordinate system. As seen in FIG. 12, the sweep begins on the material of the workpiece to avoid problems which might be introduced by the surface of the support. Parameter 7 is needed because the lines from the corner of a qualified sheet are usually not absolutely perpendicular. Therefore, the part programmer can choose which axis is used to calculate the rotation value. The same program code restrictions apply as were indicated with respect to Program G777.

With a focal length of 7 mm for the lens, it has been found that the sensitivity enables the sensor to detect scratches, marker pens, and shear angles around holes if the amplifier is not properly adjusted. A lens with a longer focal length, e.g., 20 mm. produces a larger spot diameter and makes the sensor less sensitive and, accordingly, less accurate. If accuracy could be maintained, or if the spot diameter could be reduced by improved optics and/or a highly collimated light beam, an optical system with a focal length of 55 mm or more might eliminate the need to move the sensor head from an inoperative elevated position to a lowered operative position in order to avoid its injury by the laser cutting operation.

After a period of time, smoke from the laser cutting process contaminates the lens. The lens is desirably made of glass so that periodic cleaning is possible.

In practice, the average cycle times with the illustrated installation and the programs as described have been found to be as follows:

Measure 1 internal geometric element/and recalibrate=approximately 20 seconds.
Measure 2 internal geometric elements/and recalibrate=approximately 40 seconds.
Measure and locate a qualified sheet/and recalibrate=approximately 25 seconds.

The accuracy of the sensor using the 7 mm lens has been considered to be +/−0.1 mm, and the actual measurements do fall within this range. However, if the internal geometry of the reference formation was produced by a different process, the accuracy of the other process in generating the reference formation also plays a role. This is why the deviation value for the linear distance between the 2 measured points in G777 is 0.4 mm.

As an alternative to moving the workpiece within the work station on carts 36, the workpiece support may be an elongated bed, and the workpiece 38 may be indexed thereon to allow processing of sections within the operational length of the movement of the laser head. This indexing of the carts or of the workpiece 38 on an elongated bed may be effected manually, or by a separate indexing system, or by use of the laser head support carriage.

Figure 14:
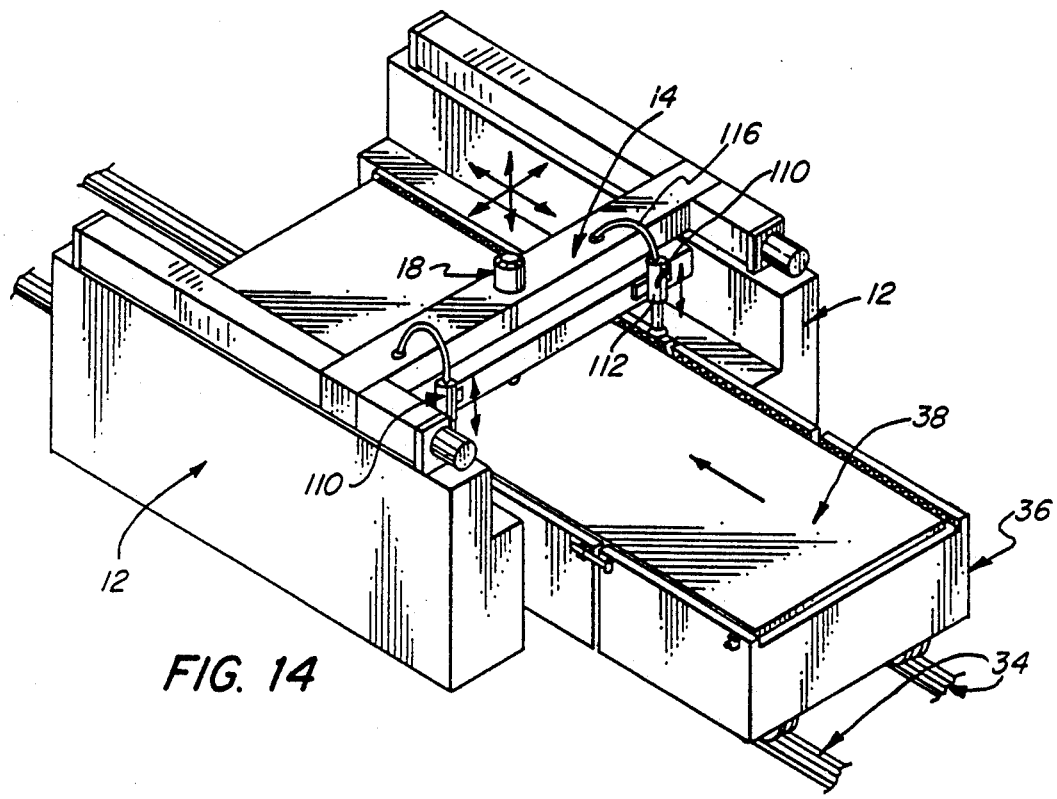
FIG. 14 is a fragmentary perspective view of the work station showing a positioning member on the laser head support carriage engaged with a cart for concurrent movement thereof in the work station.
Figure 15:
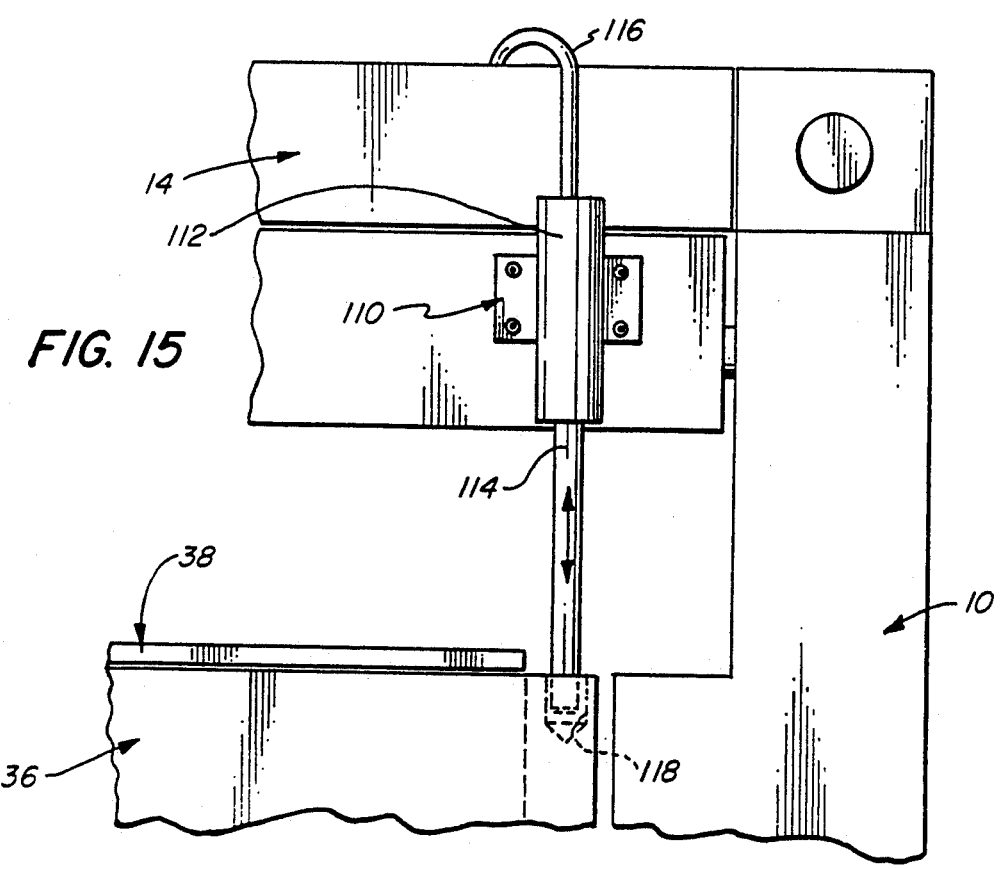
FIG. 15 is a fragmentary front elevational view of the work station seen in FIG. 14 and drawn to an enlarged scale.

Turning now to FIGS. 14 and 15, a preferred form of the apparatus has repositioning assemblies generally designated by the numeral 110 mounted on the laser head support carriage 14. Each of the repositioning assemblies 110 can be seen in FIG. 14 to include a cylinder 112 which is pneumatically actuated by pneumatic pressure through the conduit 116 to move the piston 114 upwardly and downwardly. In its downward position, the piston 114 extends into a recess 118 in the upper surface of the cart 36 adjacent its rearward end so that the laser support carriage 14 may be indexed with the workpiece 38 to a new position within the work station as will be described more fully hereinafter. The same technique may be utilized for moving the workpiece 38, or a pallet carrying the workpiece, on a fixed bed.

The size of the work station will vary with the size of the workpieces which are to be processed therein. Conveniently, a work station for processing a wide variety of workpieces would enable movement therethrough of carts which are four feet by four feet in size and provide an effective working length for the laser head of slightly less than four feet in width and up to eight feet in length without indexing of the carts therethrough.

As shown in the illustrated embodiment, the carts, or pallets, or support bed, desirably have a replaceable grid providing the top surface or work support surface to minimize the heating of the support as a result of the laser beam striking portions of the top surface as it cuts through the workpiece. These grids can be readily replaced. Moreover, the grids are desirably configured to provide a shoulder for abutment of the leading edge of the workpiece thereon to facilitate location by the workpiece guidance system.

The assembly also includes means for guiding the carts through the work station so that they may be entered or removed from either side of the station and accurately positioned therewithin. Conveniently, this is effected by using a pair of rails or tracks upon which the wheels of the carts will move. However, other systems may be employed such as a separate guide rail on the floor and a follower on the cart, or rails in one or both of the side frames with cooperating followers on the carts. The carts may be moved manually or automatically by machine control, and motorized carts (robots) may be employed if so desired.

As previously indicated, the reference formations may be generated for use with the sensor assembly, or they may comprise formations generated as a part of the preceding processing of the workpiece, or, specific edge contours of the workpiece. The preferred formations are circles, and, generally, the position sensing system will probe at least two, and preferably three, reference areas, to check the position of the workpiece prior to recalibration of the guidance system.

From the foregoing detailed specification and attached drawings, it can be seen that the laser work station of the present invention is one in which the precise position of the workpiece upon the support can be determined accurately to recalibrate the guidance system thereto and thereby facilitate precise operation thereon by the laser head under control of the guidance system and the computer control. Moreover, the workpiece may be repositioned within the work station relative thereto without any loss of accuracy in the guidance system so that oversize workpieces may be processed.

Having thus described the invention, what is claimed is:

1. A laser work station enabling precise positioning of a workpiece relative to its X-Y guidance system, the workpiece having a reference formation with at least one edge, said work station comprising:
   (a) a base member;
   (b) a workpiece support;
   (c) a laser head spaced above said workpiece support;
   (d) a laser head support member mounted on said base member for movement of said laser head relative to said base member, said laser head being movable thereon in X, Y and Z axes relative to the workpiece support;
   (e) movement means for moving said laser head in said X, Y and Z axes;
   (f) a guidance system connected to said movement means for effecting precision movement of said laser head in said X, Y and Z axes to permit said laser head to direct a laser beam onto an associated workpiece supported on said workpiece support;
   (g) an optical sensor assembly comprising (i) a light source for directing onto an associated workpiece on said workpiece support a light beam parallel to the Z-axis of movement of said laser head and (ii) light sensors about said light source for detecting light reflected from the surface of the associated workpiece upon which said light beam impinges, said sensor assembly being operable to detect reference formations on an associated workpiece carried by said workpiece support;
   (h) sensor assembly mounting means mounting said sensor assembly on said laser head for movement therewith in X-Y axes relative to an associated workpiece on said workpiece support; and
   (i) position determining means cooperating with said sensor assembly and said guidance system to:
      (i) index said laser head and sensor assembly to a preselected X-Y position relative to the approximate position of a reference formation on the associated workpiece;
      (ii) move said laser head and sensor assembly in a predetermined path from said preselected position to sense passage of the beam over an edge of a reference formation; and
      (iii) use data obtained form such sensing of the passage of the beam over an edge of the reference formation to adjust the coordinates of said guidance system to reflect the actual position of the associated workpiece on said workpiece support.

2. The laser work station in accordance with claim 1 wherein there is an elongated base member defining a work station therealong, wherein said laser head support member is a laser head support carriage mounted on said base member for movement along the length thereof, wherein there is included a laser head mounting assembly movable along said laser head support carriage relative to said base member; and wherein said movement means is adapted to move (i) said laser head support carriage along the length of said base member (ii) said mounting assembly along said laser head support carriage, and (iii) said laser head vertically on said mounting assembly, whereby said laser head is movable along said laser support carriage (Y axis), and movable with said laser support carriage along said base member (X axis), and movable in the vertical axis (Z axis) on said laser mounting assembly.

3. The laser work station in accordance with claim 1 wherein said workpiece support is a carrier movable in a path parallel to said base member, said carrier having a workpiece supporting surface on the top thereof, and wherein there are included guide means for guiding said carrier along said base member in said parallel path and carrier positioning means along said path for locating said carrier in a predetermined position along said base member.

4. The laser work station in accordance with claim 3 wherein said carrier positioning means includes a first positioning element on said carrier and a second positioning element at a fixed location along the length of said base member, said first and second positioning elements cooperating to position said carrier at a predetermined point along the length of said path.

5. The laser work station in accordance with claim 1 wherein said workpiece support includes aligning means for positioning a workpiece placed thereon.

6. The laser work station in accordance with claim 1 wherein said work station includes a computer for controlling said movement means and said guidance system.

7. The laser work station in accordance with claim 6 wherein said computer is operative in cooperation with said position determining means to move said sensor assembly to each preselected position, to effect said movement in a preselected path, to receive the sensed data, and to adjust the coordinates of said guidance system.

8. The laser work station in accordance with claim 1 wherein said light sensors are disposed concentrically about said light source.

9. The laser work station in accordance with claim 8 wherein said light source and light sensors are fiberoptics.

10. The laser work station in accordance with claim 1 wherein said work station includes means for establishing a preselected distance between said laser head and the associated workpiece and said sensor assembly includes movement means operable to move said sensor assembly relative to said laser head to a predetermined distance above the associated workpiece based upon the preselected distance of said laser head.

11. The laser work station in accordance with claim 1 wherein said position determining means indexes said laser head and sensor assembly to at least two different locations about each reference formation.

12. The laser work station in accordance with claim 11 wherein said position determining means is effective to determine the actual center of a circular reference formation and to calculate the offset of said actual center from the center of said circular reference formation as approximated to effect the adjustment of said guidance system.

13. The laser work station in accordance with claim 11 wherein said position determining means is effective to determine the actual intersection of a formation having a pair of intersecting rectilinear edges and to calculate the offset of the actual intersection from the intersection as approximated to effect the adjustment of said guidance system.

14. The laser work station in accordance with claim 11 wherein said position determining means is effective to determine the actual angular orientation of a substantially rectilinear edge and to calculate the offset of the actual angular orientation relative to the angular orientation as approximated to effect the adjustment of the guidance system.

15. The laser work station in accordance with claim 1 wherein said position determining means is operative to effect movement of said sensor assembly to at least two different reference formations on the associated workpiece and to process the data obtained from sensing said at least two formations to adjust said guidance system.

16. A laser work station enabling precise positioning of a workpiece relative to its X-Y guidance system, with workpiece having a reference formation with at least one edge, said work station comprising:
  (a) a base member;
  (b) a workpiece support including aligning means for positioning a workpiece placed thereon;
  (c) a laser head spaced above said workpiece support;
  (d) a laser head support member mounted on said base member for movement of said laser head relative to said base member, said laser head being movable thereon in X, Y and Z axes relative to the workpiece support;
  (e) movement means for moving said laser head in said X, Y and Z axes;
  (f) a guidance system connected to said movement means for effecting precision movement of said laser head in said X, Y and Z axes to permit said laser head to direct a laser beam onto an associated workpiece supported on said workpiece support;
  (g) an optical sensor assembly comprising (i) a light source for directing onto an associated workpiece on said workpiece support a light beam parallel to the Z-axis of movement of said laser head and (ii) light sensors about said light source for detecting light reflected from the surface of the associated workpiece upon which said light beam impinges, said sensor assembly being operable to detect reference formations on an associated workpiece carried by said workpiece support;
  (h) sensor assembly mounting means mounting said sensor assembly on said laser head for movement therewith in X-Y axes relative to an associated workpiece on said workpiece support; and
  (i) position determining means cooperating with said sensor assembly and said guidance system to:
    (i) index said laser head and sensor assembly to a preselected position relative to the approximate position of a reference formation on the associated workpiece;
    (ii) move said laser head and sensor assembly in a predetermined path from said preselected position to sense passage of the beam over an edge of a reference formation; and
    (iii) use data obtained form such sensing of the passage of the beam over an edge of the reference formation to adjust the coordinates of said guidance system to reflect the actual position of the associated workpiece on said workpiece support; and
  (j) a computer for controlling said movement means and said guidance system, said computer being operative in cooperation with said position determining means to move said sensor assembly to each preselected position, to effect said movement in a preselected path, to receive the sensed data, and to adjust the coordinates of said guidance system.

17. The laser work station in accordance with claim 16 wherein said light sensors are disposed concentrically about said light source and said light source and light sensors are fiberoptics.

18. The laser work station in accordance with claim 16 wherein said work station includes means for establishing a preselected distance between said laser head and the associated workpiece and said sensor assembly includes movement means operable to move said sensor assembly relative to said laser head to a predetermined distance above the associated workpiece based upon the preselected distance of said laser head.

19. The laser work station in accordance with claim 16 wherein said position determining means indexes said laser head and sensor assembly to at least two different locations about each reference formation.

20. The laser work station in accordance with claim 16 wherein said position determining means is operative to effect movement of said sensor assembly to at least two different reference formations on the associated workpiece and to process the data obtained from sensing said at least two formations to adjust said guidance system.

* * * * *